United States Patent [19]
Chantereau

[11] 3,831,761
[45] Aug. 27, 1974

[54] CLEANING SYSTEM FOR A HIGH SPEED FILTER

[75] Inventor: Robert Chantereau, Thionville, France

[73] Assignee: Societe Anonyme dite: Societelorraine de Laminage Continu, Paris, France

[22] Filed: Nov. 14, 1972

[21] Appl. No.: 306,189

[30] Foreign Application Priority Data
Nov. 16, 1971  France .................. 71.41009

[52] U.S. Cl.............. 210/274, 210/279, 210/293
[51] Int. Cl............................................ B01d 23/24
[58] Field of Search ............ 210/80, 269, 274, 275, 210/279, 291, 292, 293

[56] References Cited
UNITED STATES PATENTS

| 879,876 | 2/1908 | Jones et al. | 210/274 |
| 2,528,065 | 10/1950 | Lundberg | 210/293 |
| 2,710,692 | 6/1955 | Kegel et al. | 210/274 |
| 3,468,422 | 9/1969 | Camp | 210/274 |

FOREIGN PATENTS OR APPLICATIONS

| 695,751 | 8/1953 | Great Britain | 210/292 |

Primary Examiner—Frank A. Spear, Jr.
Assistant Examiner—Robert G. Mukai

[57] ABSTRACT

A cleaning system for a high speed filter using a filter platform of tubular distributor conduits each conduit having an associated dip tube for providing communication between the conduits and a declogging gas distributor pipe.

15 Claims, 3 Drawing Figures

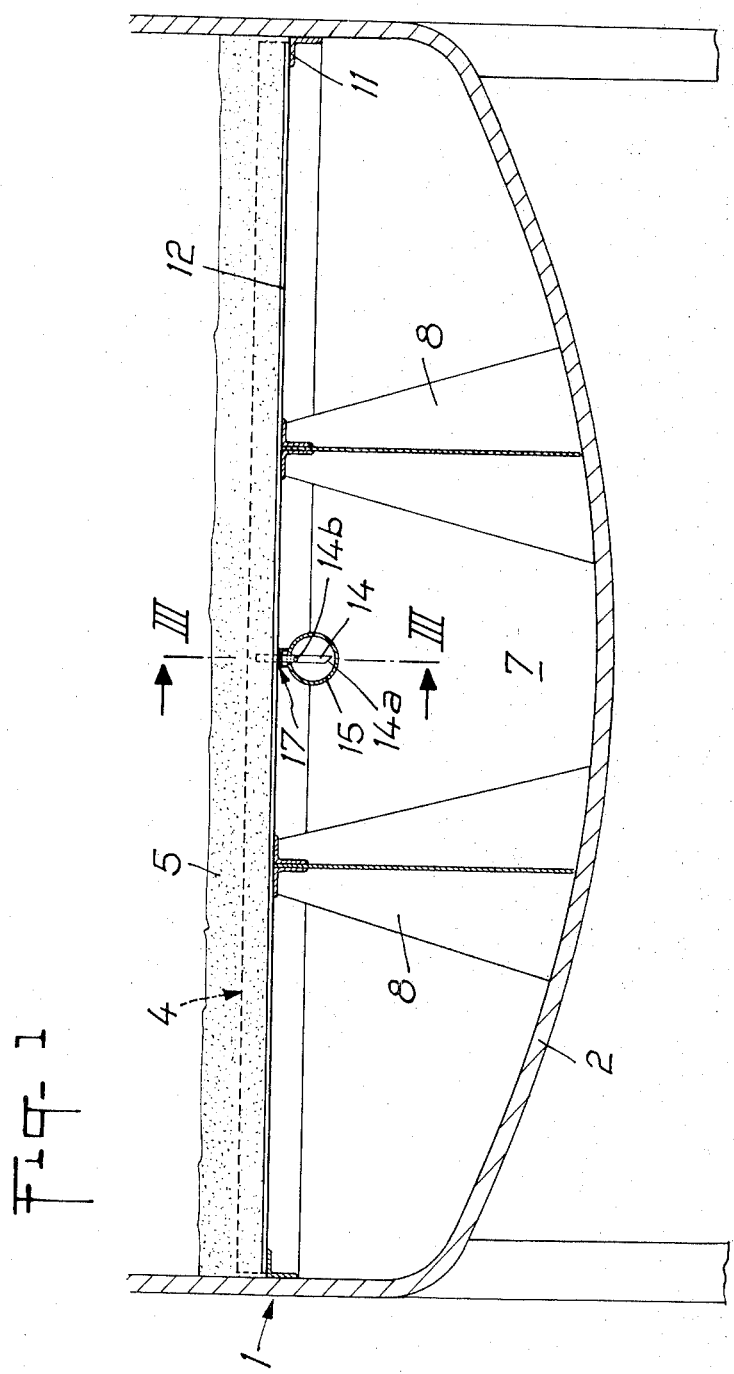

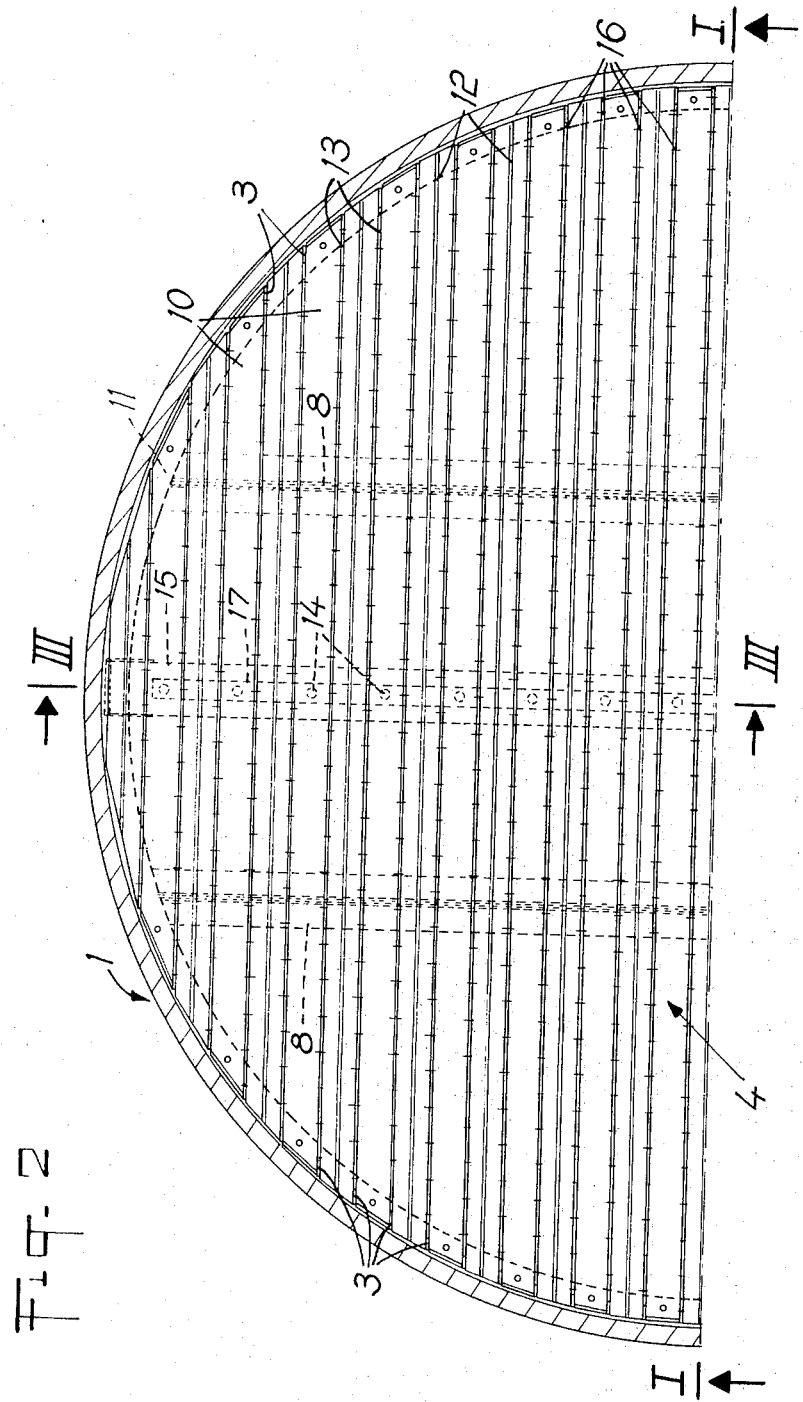

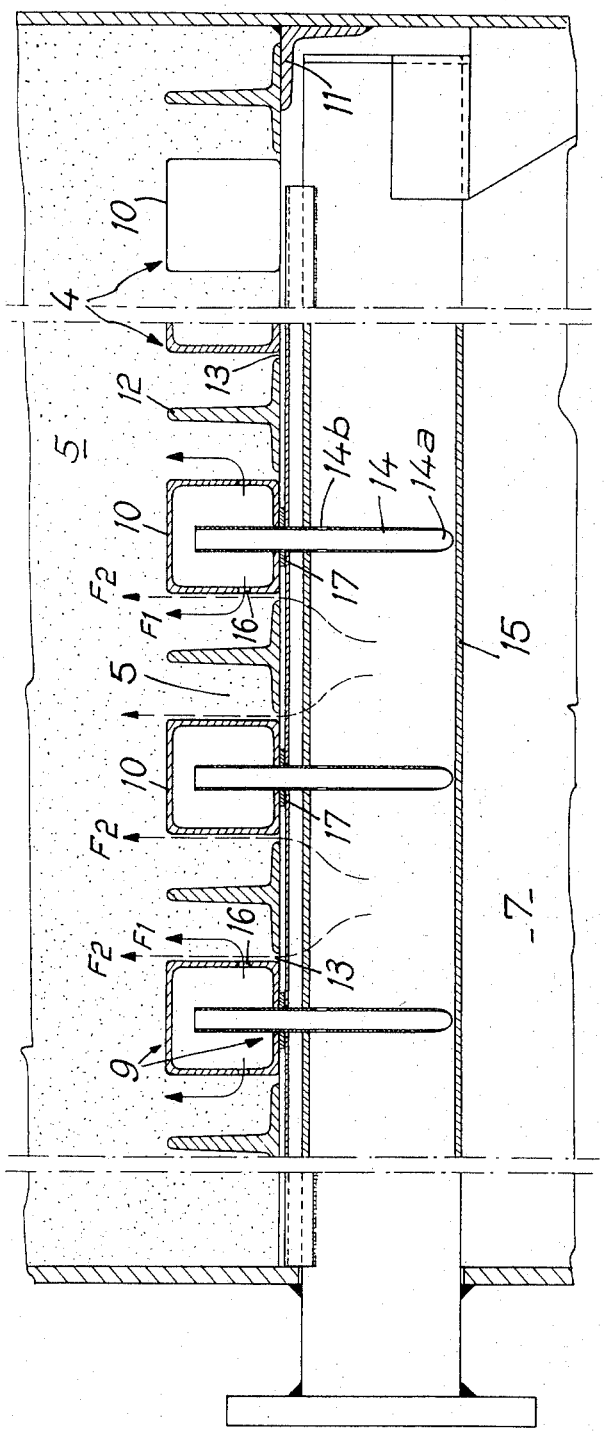

CLEANING SYSTEM FOR A HIGH SPEED FILTER

The present invention refers to a cleaning device for a high-speed filter of the type comprising within an enclosure a filter medium arranged in layers of variable grain size and thickness, a permeable platform provided in the lower portion of the enclosure and serving as support for the filter medium, a feed pipe for the liquid to be purified which opens into the enclosure at one side of the filter medium and a draw-off pipe the mouth of which lies on the other side of the said filter medium, this device comprising a plurality of cleaner nozzles on the other hand distributed uniformly over the supporting platform and on the other hand each comprising a dip tube which opens at its upper end into a distributor conduit, perforated and at least partially immersed in the lower layer of the filter medium, and which at its other end and through a lateral blast-orifice arranged in the dip tube between its two ends can be put into communication with a source of gaseous and/or liquid cleaning fluid.

In most of the known cleaning devices for high-speed filters the distributor nozzles for the cleaning fluids are attached as a rule by screwing into the support platform for the filter medium. In their upper portion bearing against the upper face of the support platform these nozzles comprise distributor orifices for cleaning fluids, and their lower portion consists of a cylindrical tube open at the ends and dipping into the enclosure contained between the platform and the bottom end of the filter. Declogging air or gas is introduced directly into this enclosure below the platform, forms a layer above a cleaning liquid such as water contained in the enclosure, and forces this liquid to enter the nozzles to the point of uncovering the lower orifices of the said nozzles in order to be then diffused into the filter medium. The liquid or water necessary for the washing and rinsing of the filter medium is distributed under more or less high pressure by these same nozzles when the input of declogging gas or air is stopped. Now, it has been established that for cleaning of the filter medium to be effective and quick, the filter medium must first of all be expanded by means of the declogging air or gas and then a flow of washing liquid must be passed into the filter medium whilst allowing the diffusion of the declogging air or gas to persist. Eventually only the feed of washing liquid is maintained. Up to now the declogging gas and the washing liquid made use of the same orifices formed in the distributor nozzles. This arrangement leads to a considerable consumption of gas since in order to achieve effective gas injection the orifices in the nozzles should have fairly small diameters and this condition cannot be fulfilled because for the injection of the washing liquid the section of the orifices must be relatively large in order to avoid too high load losses. As the filtered water in general flows through the nozzles in the opposite direction to the declogging and washing fluids the nozzle orifices must be big enough not to impede the filtration flow. Furthermore it is important that the diffusion of the declogging gas should be effected uniformly over the whole surface of the platform, which is not the case with know filters.

The object of the invention is to produce a washing device of the above-mentioned type which is simple in conception and enables the filter medium to be expanded at the commencement of washing, the air or gas to be distributed uniformly into the filter medium, and the proportion between the two fluids, gas and liquid, to be adjusted perfectly, and which finally affords the filtered liquid an escape independent of the gas distribution system.

The whole of these aims is achieved from the fact that the distributor conduits consist of tubular boxes serving as members of the support platform, that with each box is associated at least one dip tube entering in a gastight manner at its lower end into a distributor pipe for declogging gas, that this pipe is common to at least a number of dip tubes and communicates with the interior of the enclosure only via the dip tubes and distributor conduits, and that between the distributor conduits the support platform has a plurality of exhaust openings which establish communication between the two sides of the platform.

Thus the distributions of the declogging gas and of the washing liquid can be adjusted as required with a minimum loss of energy and maximum effectiveness without the escape of the filtered liquid in the course of normal operation being impeded by the features of construction of the cleaning device.

A particularly interesting embodiment is obtained when the tubular boxes extend parallel with one another from one side of the enclosure to the other. The exhaust openings between the tubular boxes are preferably slits bounded on the one hand by the outer wall of the boxes and on the other hand by rolled sections arranged parallel with the tubular boxed and alternating with the latter. The orifices provided on the distributor conduits having the form of tubular boxes, are at a level higher than that of the slit-shaped exhaust openings. Advantageously the space between two adjacent tubular boxes is filled with a filter medium and is bounded at the bottom by one of the rolled sections alternating with the said boxes. The space between two adjacent tubular boxes is subdivided by a partition into two compartments open at the top. Preferably the partition and the rolled section bounding the bottom of the space between two tubular boxes consist of an inverted T-section the flanges of which define by their free edges and in cooperation with the walls of the adjacent tubular boxes, the slit-shaped exhaust openings. The edges of the rolled sections are maintained at a certain distance from the walls of the adjacent boxes by means of gauged spacer-wedges preferably welded to one of the two members defining the exhaust openings. Advantageously the section of the tubular boxes is rectangular or square so that the sidefaces of the boxes are parallel with the partition or the web of the inverted T-shaped section. The height of the partition or web of the rolled section is preferably at least equal to the height of the tubular boxes. The distributor orifices in the tubular boxes are arranged in the sidewalls and preferably halfway up the said boxes. The distributor orifices are advantageously arranged in at least one row parallel with the axes of the boxes and preferably with a stagger between them in the respective sidewalls of the boxes. These distributor orifices are above the exhaust openings. Furthermore the distributor orifices can be furnished with a protective coating.

The dip tube has in the section of it inside the distributor pipe at least one lateral blast orifice located near the crest line of this pipe. The lower end of the dip tube is bevelled and is at least very near to if not in contact with the trough line of the distributor pipe. Each dip tube enters the same distributor pipe which is preferably arranged in a plane perpendicular to the axes of the tubular boxes and passing through the axis of the filter. The upper end of the dip tube is at a level higher than that of the distributor orifices.

The invention will better understood by means of the following description of a non-restrictive embodiment illustrated in the attached drawing in which:

FIG. 1 is a vertical radial section along line I—I of FIG. 2 through the lower portion of a high-speed filter equipped with a cleaning device in accordance with the invention;

FIG. 2 is a plan view of the cleaning device as in FIG. 1; and

FIG. 3 is a part vertical section alone line III—III in FIGS. 1 and 2.

Inside an enclosure 1 having a bottom 2 is provided a perforated support platform 4 for a number of layers of granules of silica, anthracite, etc. of variable grain and thickness and constituting the filter medium 5. The upper portion (not shown) of the filter may be open or closed and have above the filter medium 5 a feed pipe (not shown) for the liquid to be purified, such as mine water, river water, etc. The space enclosed between the lower face of the support platform 4 and the bottom 2 of the enclosure 1 forms an exhaust chamber 7 which has at the lowest point an exhaust pipe (not shown). The support platform 4 rests on stools 8 resting on the bottom 2.

In the embodiment described the enclosure 1 exhibits a circular section. Distributor conduits, arranged on the platform 4, consists in the present instance of tubular boxes 10 which preferably have a rectangular or square section. These boxes form part of the platform 4 and rest on the one hand on the stools 8 and on the other hand on an internal shoulder 11 in the enclosure 1 and extend parallel with one another and perpendicular to the said stools 8. These distributor boxes or conduits serve at the same time to support part of the filter medium 5. Between adjacent boxes 10 a rolled section is provided, preferably an inverted T, 12, which rests by its horizontal flanges on the stools 8 and the internal shoulder 11. The edges of the flanges of the T-section are slightly separated from the sidewalls of the tubular boxes 10 acting as beams, so as to leave straight slits 13 of a width, for example, of the order of 2 to 5 mm according to the grain size of the filter layer arranged directly on the platform 4 formed of beams 10 and sections 12. The web of the inverted T-section forms a partition separating the space contained between two boxes 10 into two compartments open at the top. In order to fix the width of the slits 13 spacer plates or wedges 3 are welded to the ends, for example, of the sidewalls of the tubular boxes 10.

The sections 12 rest by their horizontal flanges, just like the boxes 10, on the stools 8. Halfway between the two ends of a tubular box 10 the lower face of the latter has an opening through which passes in a gastight manner a dip tube 14 which at its upper end enters the distributor box or conduit and at its lower end dips into a compressed air distributor pipe 15 arranged perpendicular to the dip tube 14 and extending radially in a horizontal plane from one side of the enclosure 1 to the other. This distributor pipe 15 passes in a gastight manner through the wall of the enclosure 1 and is connected to a source of compressed air or like gas.

The upper end of the dip tube 14 is close to the upper face of the box 10 and above the level determined by the rows of distributor perforations or orifices 16 provided in the sidewalls of the box 10. At its lower end which is preferably in contact with the trough line of the distributor pipe 15 the dip tube 14 is bevelled so that the bottom opening of this tube exhibits the shape of an ellipse 14a.

The distributor perforations or orifices 16 in one wall are offset parallel with the axis of the tubular box in relation to the perforations in the opposite wall of the said box so that seen as a whole the distributor perforations 16 are arranged in a diamond pattern (see FIG. 2).

Near the crest line of the distributor pipe 15 the section of the dip tube lying inside the said pipe 15 has at least one lateral so-called blast orifice 14b which establishes communication both between the dip tube 14 and the distributor pipe 15.

The section of the distributor box or cage 10 in the case of the example described exhibits a square shape. Obviously the cross-section of the distributor conduit 10 can have different shapes e.g., rectangular, etc.

At the point at which the dip tube 14 enters the distributor box 10 a rubber gastight joint 17 is provided. It will be noted that for each distributor conduit 10 only one single dip tube 14 has been provided.

Into the exhaust chamber 7 a washing liquid feed pipe (not shown) may enter, which differs from the exhaust pipe for the filtered or purified water. It is also possible to make this washing water feed pipe enter the exhaust pipe outside the filter enclosure.

The method of cleaning the filter is as follows:

During filtration liquid may accumulate inside the distributor conduits 10 and the air distributor pipe 15 because the liquid to be purified passing through the filter medium 5 flows not only through the slits 13 into the exhaust chamber 7 but may likewise pass through the distributor perforations or orifices 16 into the interior of the conduits 10 and thence through the dip tube 14 into the distributor pipe 15.

When the declogging air or gas is passed into the pipe 15 it passes through the blast orifices 14b into the chamber of the distributor conduit 10 and expels the liquid in it out through the distributor perforations 16. At the same time the liquid contained in the distributor pipe 15 is driven through the bottom bevelled opening 14a in the dip tube 14 into the chamber inside the distributor conduit 10 from the effect of the air or gas cushion which forms first of all in the upper part of the pipe 15 and progressively fills almost entirely the interior of this pipe 15. From the instant at which the air or gas enters the dip tube 14 through its bottom opening 14a the distributor perforations 16 no longer pass anything but air or gas, the amount of liquid between the bottom wall and the distributor perforations 16 in the conduit 10 remaining permanently within the said conduit.

Simultaneously with the process which has been described, cleaning liquid can also be passed into the exhaust chamber 7, the exhaust pipe from this chamber being closed. The cleaning liquid passes through the slits 13 into the filter medium 5 and through the latter to the surface of this filter medium, carrying with it the impurities previously deposited in the pores of this filter medium.

It is to be specially noted that in FIG. 3 the distributor perforations or orifices 16 and the slits 13 are relatively near one another, so that a mixture of air or gas and liquid is produced in the space bounded by the vertical web of the inverted T-section and the vertical walls of the conduit 10 when liquid and compressed air or gas are admitted simultaneously. It is also possible to stop the flow of one or other of the cleaning agents. The cleaning fluid containing the impurities is exhausted in a manner known in itself at the surface of the filter medium 5.

For convenience the directions of flow of the declogging air or gas and the cleaning liquid respectively have been indicated on FIG. 3 by the arrows $F_1$ and $F_2$.

The distributor perforations or orifices 16 may in addition be furnished with a protective coating.

Of course the embodiment which has just been described may undergo a certain number of modifications without thereby departing from the scope of the invention. Thus the invention holds good when the liquids to be purified pass through the filter medium from the bottom upwards rather than from the top downwards as has just been described here.

I claim:

1. A cleaning system for a high-speed filter of the type comprising within an enclosure a layer of granular filter medium in the vicinity of the lower portion of the enclosure, a feed pipe for the liquid to be purified which opens into the enclosure at the top of the filter medium and a draw-off pipe the mouth of which communicates with the lower side of the said filter medium; said system comprising a permeable platform for supporting the filter medium, a plurality of distributor conduits each consisting of a tubular box of rectangular or square section parallel with one another and serving as members of the support platform; each distributor conduit including a dip tube which opens at its upper end into said distributor conduit at a level which, in use, is above the bottom of the filter medium, and which at its other end and through a lateral blast-orifice arranged in the dip tube between its two ends and below the bottom of the bed can be put into communication with a source of cleaning fluid; each conduit being associated with a dip tube such that said dip tube enters in a gas-tight manner at its lower end into a distributor pipe for declogging gas, the support platform having between the distributor conduits a plurality of exhaust openings which establish direct communication between the upper and lower sides of the platform and which consists of slits bounded on the one hand by the outer wall of the distributor conduits and on the other hand by sections arranged parallel with the distributor conduits and alternating with the latter; the conduits have a plurality of lateral distributor orifices said distributor orifices being in predetermined relationship with one another and which are at a level higher than that of the slit-shaped exhaust openings.

2. A cleaning system for a high-speed filter as in claim 1, wherein the space defined by two adjacent distributor conduits is filled with a filter medium, and is bounded at the bottom by one of the sections alternating with the said distributor conduits.

3. A cleaning system for a high-speed filter as in claim 2, wherein the edges of the sections are maintained at a certain distance from the walls of the adjacent distributor conduits by means of gauged spacer-wedges preferably welded to at least one of the two members defining the exhaust openings.

4. A cleaning system for a high-speed filter as in claim 3, wherein the upper end of the dip tube is at a level higher than that of the distributor orifices.

5. A cleaning system for a high-speed filter as in claim 2, wherein said space is subdivided by a partition into two compartments open at the top, the partition and the section bounding the bottom of the space between the two distributor conduits being provided by an inverted T-section, the flanges of which define by their free edges and in co-operation with the walls of the adjacent distributor conduits, the slit-shaped exhaust openings.

6. A cleaning system for a high-speed filter as in claim 5, wherein the edges of the sections are maintained at a certain distance from the walls of the adjacent distributor conduits by means of gauged spacer-wedges preferably welded to at least one of the two members defining the exhaust openings.

7. A cleaning system for a high-speed filter as in claim 5, wherein the height of the partition is at least equal to the height of the distributor conduits.

8. A cleaning system for a high-speed filter as in claim 1, wherein the height of a web of the section is at least equal to the height of the distributor conduits.

9. A cleaning system for a high-speed filter as in claim 1 wherein the distributor orifices arranged in the sidewalls of the distributor conduits are provided in the lower half of the said distributor conduits.

10. A cleaning system for a high-speed filter as in claim 9, wherein the distributor orifices are furnished with a protective coating.

11. A cleaning system for a high-speed filter as in claim 9, wherein the upper end of the dip tube is at a level higher than that of the distributor orifices.

12. A cleaning system for a high-speed filter as in claim 1, wherein the distributor orifices are arranged in a single row parallel with the longitudinal axes of the distributor conduits.

13. A cleaning system for a high-speed filter as in claim 1, wherein the distributor orifices in the respective sidewalls of a distributor conduit are in staggered relationship with the distributor orifices of the adjacent distributor conduit.

14. A cleaning system for a high-speed filter as in claim 1, wherein the distributor orifices are furnished with a protective coating.

15. A cleaning system for a high-speed filter as in claim 14, wherein the upper end of the dip tube is at a level higher than that of the distributor orifices.

* * * * *